US007313706B2

(12) United States Patent
Williams et al.

(10) Patent No.: US 7,313,706 B2
(45) Date of Patent: Dec. 25, 2007

(54) SYSTEM AND METHOD FOR MANAGING POWER CONSUMPTION FOR A PLURALITY OF PROCESSORS BASED ON A SUPPLY VOLTAGE TO EACH PROCESSOR, TEMPERATURE, TOTAL POWER CONSUMPTION AND INDIVIDUAL PROCESSOR POWER CONSUMPTION

(75) Inventors: Gary Wayne Williams, Rowlett, TX (US); Paul Wirtzberger, Greenville, TX (US); Shaun L. Harris, McKinney, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 437 days.

(21) Appl. No.: 10/246,024

(22) Filed: Sep. 17, 2002

(65) Prior Publication Data

US 2004/0054937 A1    Mar. 18, 2004

(51) Int. Cl.
G06F 1/00      (2006.01)
G06F 11/30     (2006.01)

(52) U.S. Cl. ...................... 713/300; 713/340
(58) Field of Classification Search ............... 713/300, 713/310, 320, 322, 340; 714/14
See application file for complete search history.

(56) References Cited

U.S. PATENT DOCUMENTS 4,276,591 A    6/1981   Quick

| | | | | |
|---|---|---|---|---|
| 4,639,864 A * | 1/1987 | Katzman et al. | ............... | 714/14 |
| 6,154,845 A * | 11/2000 | Ilkbahar et al. | ............. | 713/300 |
| 6,167,330 A * | 12/2000 | Linderman | .................. | 700/295 |
| 6,182,232 B1 * | 1/2001 | Klein | ......................... | 713/340 |
| 6,304,823 B1 | 10/2001 | Smit et al. | | |
| 6,414,469 B1 | 7/2002 | Zhou et al. | | |
| 6,420,838 B1 | 7/2002 | Kitagawa et al. | | |
| 6,675,302 B2 * | 1/2004 | Ykema | ....................... | 713/300 |
| 6,728,601 B2 * | 4/2004 | Garcia et al. | ............... | 700/286 |
| 6,836,849 B2 * | 12/2004 | Brock et al. | ................ | 713/310 |
| 2003/0023884 A1 * | 1/2003 | See et al. | ................... | 713/300 |

FOREIGN PATENT DOCUMENTS

JP          03044719 A  *   2/1991

OTHER PUBLICATIONS

Rowe Martin, Isolation boosts saftey and integrity, Jul. 1, 2002, Test & Measurement World.*
Optically-Coupled Linear Isolation Amplifiers, 1997, Burr-Brown.*

* cited by examiner

Primary Examiner—Thomas Lee
Assistant Examiner—Mark Connolly (57) ABSTRACT

An electronic processing system contains a power supply subsystem and a multi-processor module. Programmable control circuitry manages power consumption in the electronic system by allocating priority among a plurality of competing demands, such as total power consumption, power consumption at any one of the processors, and thermal measurements. Analog sense measurements of incoming power are transmitted to the control circuits, which are protected from noise through use of an isolation barrier established by a linear isolation amplifier.

12 Claims, 5 Drawing Sheets

SYSTEM AND METHOD FOR MANAGING POWER CONSUMPTION FOR A PLURALITY OF PROCESSORS BASED ON A SUPPLY VOLTAGE TO EACH PROCESSOR, TEMPERATURE, TOTAL POWER CONSUMPTION AND INDIVIDUAL PROCESSOR POWER CONSUMPTION

BACKGROUND OF THE INVENTION

1. Field of the Invention

The invention pertains to the field of power management for electronic processing systems. More specifically, power usage is controlled on the basis of sensed feedback signals, such as voltage, current and temperature.

2. Discussion of the Related Art

Electronic systems designers are challenged by stringent and ever-changing requirements of new-generation processors. U.S. Pat. No. 6,414,469 issued to Zhou et al. describes these challenges as being a progressive drop in operating voltage from 5V to 3.3V towards an eventual range of from 1.1V to 0.8V. At the same time, current draws are increasing from about 13A to a range between 30A and 70A per processor. The tolerance for operational voltage is shrinking, e.g., from ±5% to ±1% of design voltage, while the processors are operating at ever higher frequencies and consuming more power. All of these factors combine to require more aggressive power management features than have previously been installed in electronic systems. The '469 patent addresses the problem of DC-DC converter noise by connecting voltage regulator modules in parallel such that, when a processor becomes active, the resultant transient response time of the converter is improved by transient ripples from the respective converters canceling one another. The '469 patent does not disclose a robust power management capability.

In general, robust power management features have not been incorporated into power converters or power supplies. U.S. Pat. No. 6,420,858 issued to Kitagawa et al. describes a DC-to-DC converter having a power saving mode. The '858 patent describes a variety of converters including converters with sense circuitry to monitor the voltage output. Sense signal feedback is used to control the voltage output of the converter at a level equal to a design power output. The use of sense circuitry that does not require a sense resistance may reduce power consumption in some designs. These features may save power, but they do not manage or control the delivery of power to a processor.

U.S. Pat. No. 4,276,591 issued to Quick describes a DC power supply that rectifies AC input power to produce a desired DC voltage. The DC power output is compared to a control signal to regulate the DC voltage through use of saturable reactors in the AC input lines. Thus, the system is capable of providing a constant output power at variable DC voltage and load current. While the power supply is useful in cathode sputtering systems and the like, the inability to control power output renders the power supply poorly suited for use in power management systems that require a varying power output.

Processor power management systems may include a programmable brownout detector, for example, as described in U.S. Pat. No. 6,304,823 issued to Smit et al. The brownout detector is designed to sense an under-voltage condition below a minimum operating threshold for the processor. The minimum operating threshold may be supplied as a programmable value. The '823 patent, however, does not describe a power management system in which the brownout control may conflict with other power management objectives.

SUMMARY

Features described herein advance the art and overcome the problems outlined above by providing a robust power management system that allocates power to a variety of system components according to a set of rules. The power allocation capability is particularly useful in electronic systems having multiple processors.

According to one aspect, an electronic system may include a power delivery subsystem, such as a battery, a DC source, or an AC to DC converter. A processor module may contain one or more central processing units or processors. A power supply subsystem may include at least one power supply that is adapted to distribute power from the power delivery subsystem to the processor module. Programmable control circuitry may be configured to manage power consumption at the processor module by slowing or pausing processor operations on a rules basis selected to manage or govern a group of power management priorities. The power management priorities may conflict with one another, and power consumption may be allocated by resolving conflicts between the power management priorities.

Sense circuits may be used to provide power information signals to the programmable control circuitry, such as voltage and current measurements of incoming power from the power delivery subsystem. An isolation barrier, such as a linear isolation amplifier or filter, may then be used to protect the programmable control circuitry from noise in the power information signals.

The programmable control circuitry may be configured to include limiting values in the group of power management priorities. For example, the power management priorities may include a system thermal limit and a total system power consumption limit. Other power management priorities may include, for example, an under-voltage control limit to prevent silent data corruption from brownout conditions.

The processor module may contain a plurality of processors. In this case, the power supply subsystem may contain a plurality of power supplies, with each processor receiving power from a dedicated power supply. Thus, the group of power management priorities may also include a limit for power consumption at each processor, in addition to the system thermal limit, the total system power consumption limit, and the under-voltage control limit. These power management priorities may be used singly or in combination.

The programmable control circuitry may include a field programmable gate array (FPGA) or a digital signal processor adapted to receive comparator outputs for allocating processor power.

In one method of operation, the electronic system operates according to the steps of delivering power to the electronic system, distributing the power to a processor module, and managing power consumption at the processor module. The step of managing power consumption at the processor module may be performed by governing processor operations, e.g., by slowing, pausing or accelerating operations, on a basis selected from a group of power management priorities. Certain power management priorities may sometimes conflict with one another, and conflicts may be resolved by a controller or control circuitry that implements rules for this purpose. Processor operations may be adjusted for increased processor speed within limits defined by the power management priorities when it is appropriate to increase operating speed. Power consumption may be governed by adjusting processor clock speeds and/or changing voltage output levels from the power supplies.

Upon reading the following detailed description, in addition to the accompanying drawings, those skilled in the art will appreciate that additional features and advantages are disclosed.

DETAILED DESCRIPTION

Figure 1:
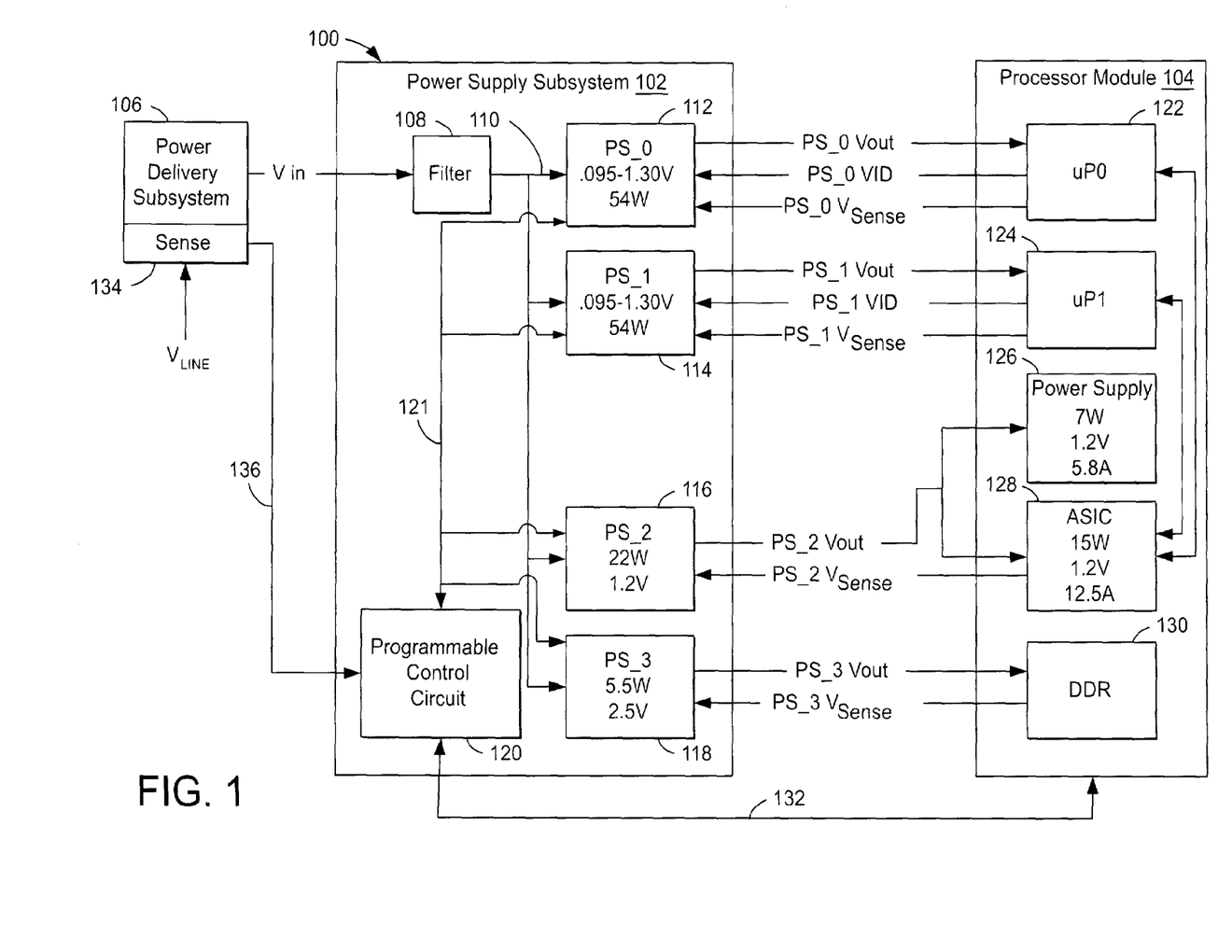
FIG. 1 is a block schematic diagram of one electronic system having a programmable control circuit with power allocation capability.

FIG. 1 is a block schematic diagram of a dual-processor electronic system 100. A programmable power supply subsystem 102 may distribute power to a multi-processor module 104; programmable power supply subsystem 102 may also include multiple power supplies 112, 114, 116, and 118. Power supply subsystem 102 and the multi-processor module 104 may be integrated on a shared board. Electronic system 100 and the associated discussion thereof are provided to illustrate principles of the invention by way of example, not by limitation.

Power supply subsystem 102 may include, for example, an isolated, high efficiency, compact DC-DC converter that provides four DC output voltages—namely, PS_O $V_{out}$, PS_1 $V_{out}$, PS_2 $V_{out}$, and PS_3 $V_{out}$—from respective power supplies 112, 114, 116, and 118. The specific voltages and power outputs shown in FIG. 1 are shown by way of example to illustrate relative voltages of the respective components in system 100 in a possible commercial embodiment. However, those skilled in the art should recognize that other system power and voltages may be used without departing from the scope of the invention.

An intermediate power delivery subsystem 106 may accept a line voltage, $V_{line}$, which can be from a standard 110V AC line, for conversion to a DC input voltage, $V_{in}$, e.g., of 48V±1.4V. Input voltage $V_{in}$ may be filtered through filter 108 for noise reduction for input to power supplies 112, 114, 116, and 118, on signal line 110. Power delivery subsystem 106 may for example include a compact multiphase 450 Khz to 1.0 Mhz buck converter to down-regulate voltage $V_{in}$ delivered to power supplies 112, 114, 116, and 118. Those skilled in the art should appreciate that the functionality of power delivery subsystem 106 may be implemented within power supply subsystem 102 without departing from the scope of the invention.

Power supplies 112, 114, 116, and 118 may be programmable fixed duty cycle power converters with voltage feedback circuits that, respectively, monitor PS_0 $V_{out}$, PS_1 $V_{out}$, PS_2 $V_{out}$, and PS_3 $V_{out}$, through sense signals PS_0 $V_{Sense}$, PS_1 $V_{Sense}$, PS_2 $V_{Sense}$, and PS_3 $V_{Sense}$, to assure accurate voltage output. As will be explained in greater detail below, programmable control circuit 120 may operate to control voltage and current through electronic system 100, control the programmable configuration of power supplies 112, 114, 116, and 118, control temperature-sensitive power output as a function of processor temperature, and/or enable current margining.

According to one embodiment, programmable control circuit 120 senses parameters including power consumption, system voltage, and system temperature. Programmable control circuit 120 may control power consumption by slowing processor operations on individual processors within processor module 104 to maintain such parameters within design limits. Reduced processor speeds may be increased when power consumption is no longer constrained by such parameters.

In one embodiment, programmable control circuit 120 may, on the basis of control parameters, adjust the clock speed of individual processors within the processor module 104; programmable control circuit 120 may at the same time control programmable power supplies 112 and 114, via control signals on signal line 121, to reduce output voltages PS_O $V_{out}$ and PS_1 $V_{out}$ with the adjustment of clock speed. Reduced processor speeds may, for example, be increased when power consumption is no longer constrained.

In the nonlimiting example shown as FIG. 1, electronic system 100 may be designed to have a maximum power consumption of 170 Watts. Accordingly, power supplies 112 and 114 may each provide a nominal output voltage of 1.15 volts DC (VDC) at 47A to each deliver 54W. Power supply 116 may be designed to provide a voltage of 1.2VDC at 18.3A to deliver 22W. Power supply 118 may be designed to provide 2.5 VDC at 2.2A to deliver 5.5W. Thus, the power throughout of electronic system 100 under nominal load may, for example, be 135.5W. This is a nonlimiting example because other systems of the general type shown in FIG. 1 are not constrained by these values for current, voltage and power.

Multi-processor module 104 may include a processor 122 (uP0) and a processor 124 (uP1). Processors 122 and 124 may, for example, represent dual processors in a multi-processor computer or a telecommunications server.

Power supply 112 may provide power to processor 122, as indicated by output voltage PS_0 $V_{out}$. Processor 122 may be programmably configured to operate at a variety of voltages, or it may be designed to operate at a single voltage. As shown in FIG. 1, power supply 112 may accept feedback information from processor 122 and use this feedback information to assure that voltage PS_0 $V_{out}$ is maintained within established parameters. Specifically, processor 122 may transmit a digital voltage identification signal, e.g., a four bit digital representation of voltage PS_0 VID, to power supply 112, as well as a sensed voltage signal PS_0 $V_{Sense}$. Signals PS_0 VID and PS_0 $V_{Sense}$ may alternatively be provided as output features of processor 122 or by circuitry with multi-processor module 104. Power supply 112 may, for example, compare signals PS_0 VID and PS_0 $V_{Sense}$, and adjust voltage PS_0$V_{out}$ to deliver the required voltage to processor 122. Power supply 114 may similarly regulate output voltage PS_1 $V_{out}$ to processor 124 in the same manner using signals PS_1VID and PS_1 $V_{Sense}$.

Multi-processor module 104 may contain an internal power supply 126 that provides internal power for components of multi-processor module 104. An application specific integrated circuit (ASIC) 128 may function as an arbitrator between the processors 122 and 124 seeking to access double data rate (DDR) memory 130, e.g., a memory that allows data transfer at rising and falling clock cycles. ASIC 128 may also provide other functions for multiprocessor module 104. Power supply 126 and ASIC 128 may receive power from power supply 116, as indicated by the output voltage PS_2 $V_{out}$. ASIC 128 may sense output voltage PS_2 $V_{out}$ and provide a corresponding signal PS_2 $V_{Sense}$ indicating the magnitude of the sensed voltage to power supply 116, which may in turn use signal PS_2 $V_{Sense}$ to regulate output voltage PS_2 $V_{out}$ within design parameters. Similarly, DDR memory 130, may receive power from power supply 118 indicated by the output voltage PS_3 $V_{out}$, which may be regulated using the sensed voltage PS_3 $V_{Sense}$. DDR memory 130 may be coupled with processors 122 and 124 for memory support of processor operations.

A bus 132 may for example be used to carry data and control signals between programmable control circuit 120 and multi-processor module 104, and in support of the functions described herein.

The amount of power that may be consumed by electronic system 100 may be subject to a variety of constraints. The task of controlling the operation of electronic system 100 to implement these constraints may reside with programmable control circuit 120. For example, simultaneous and competing design constraints may include a maximum throughput of 170W in power supply subsystem 102 versus a maximum consumption of 80W at either or both of the processors 122 or 124. Power consumption may be regulated by slowing or pausing operations of one or both of the processors 122 and 124. Additional power consumption may occur, for example, at power supply 126 (7W), ASIC 128 (15W), and DDR memory 130 (5.5W), totaling 27.5W. By way of further example, computational demands on processor 122 may require 90W of power, which may necessitate pausing or slowing operations to conserve or regulate power consumption by processor 122 to no more than 80W. At the same time, processor 124 may also utilize 80W. The combined power utilization of processors 122 and 124 in this example places total processor power consumption at 160W which, when combined with the other power consumption of 27.5W, exceeds the aforementioned 170W. Accordingly, programmable control circuit 120 may be programmed to allocate and distribute power between processors 122 and 124, and/or to slow the clock speed of processors 122 and 124 to maintain total power consumption within the 170W throughput limitation.

Programmable control circuit 120 may sense voltage and current of power delivery subsystem 106 through the use of signal sense circuitry 134. Other signals representing voltage and current may also be transmitted to programmable control circuit 120 from other components of electronic system 100, to support the power aware features of programmable control circuit 120. Filter 108 may protect electronic system 100 from spikes or surges from power delivery subsystem 106. At the same time, programmable control circuit 120 may advantageously obtain direct sense measurements, without filtering, from power delivery subsystem 106, via sense circuitry 134 and bus 136.

Figure 2:
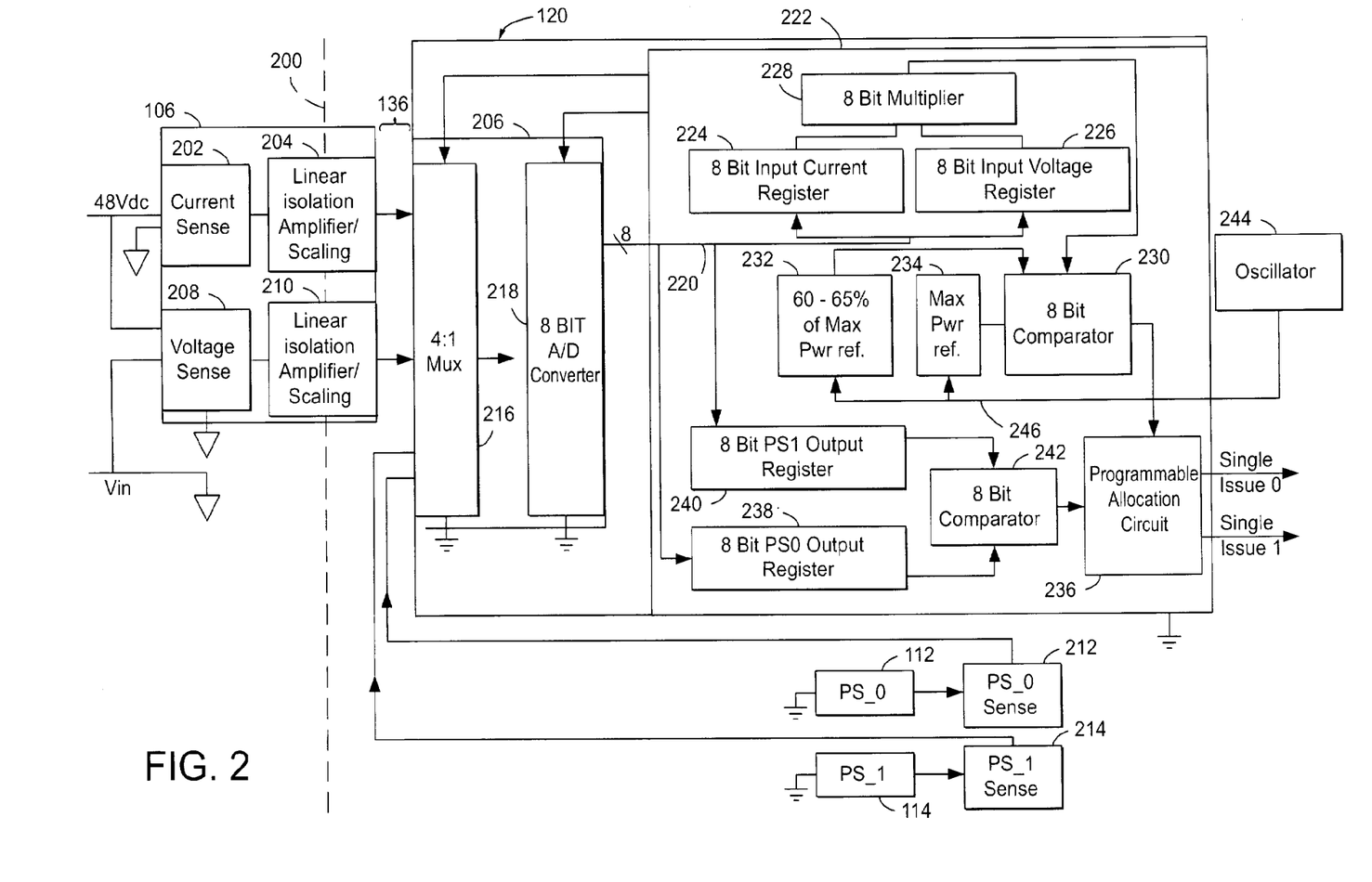
FIG. 2 is a block schematic diagram showing portions of one programmable control circuit that are used to allocate power consumption.

FIG. 2 is a block schematic diagram illustrating, by way of example, details of one programmable control circuit 120 that may be used to isolate programmable control circuit 120 from noise of power delivery subsystem 106. FIG. 2 depicts this isolation as an isolation barrier 200, which facilitates control of total system power consumption by programmable control circuit 120 within a maximum allowable limit. Inside power delivery subsystem 106, current sense circuitry 202 may provide an analog signal to a current linear isolation amplifier 204. Linear isolation amplifier 204 may then provide an amplified analog signal to a multiple input analog-to-digital converter 206 within programmable control circuit 120. The amplified analog signal from linear isolation amplifier 204 may be a scale representation of the signal originating from current sense circuitry 202. Similarly, voltage sense circuitry 208 may provide an analog signal to a voltage linear isolation amplifier 210. Voltage linear isolation amplifier 210 may then provide a scale representation of the incoming voltage to multiple input analog-to-digital converter 206. Thus, isolation barrier 200 may be established through use of linear isolation amplifiers 204 and 210. Two additional analog measurements may be sent to multiple input analog-to-digital converter 206, including those from power sense circuit 212 for power supply 112 and power sense circuit 214 for power supply 114.

Accordingly, four analog inputs may enter the multiple-input analog-to-digital converter 206. Multiple input analog-to-digital converter 206 may include a 4:1 analog multiplexer 216, which receives the aforementioned four input signals. An analog-to-digital converter 218 may convert the multiplexed analog signals to an eight bit digital signal on bus 220. This digital signal may be processed by a field programmable gate array (FPGA) 222.

Within FPGA 222, the digital signal from current sense circuit 202 may be input to an eight bit input current register 224. Similarly, the digital signal from voltage sense circuit 208 may be input to an eight bit input voltage register 226. Eight bit multiplier 228 may multiply the respective signals from registers 224 and 226 to obtain a power signal, which may be input to an eight bit comparator 230. Eight bit comparator 230 may optionally compare the incoming power signal according to one of two programmable options, illustrated by process circuits 232, 234: in the first option, process circuit 232 provides a comparison against a reference voltage signal representing, for example, 60% to 65% of the maximum power limit for power supply subsystem 102, FIG. 1; in the second option, process circuit 234 provides a comparison against a reference voltage signal representing 100% of the maximum power limit. Eight bit comparator 230 may then generate a signal indicating the comparison outcome as to which signal is greater. This signal may be input to a programmable allocation circuit 236.

A similar comparison may be made on the basis of measurements from power sense circuit 212 and power sense circuit 214, and through analog-to-digital converter 206. The digital signal from power sense circuit 212 may thus be input to an eight bit PS_0 output register 238. The digital signal from power sense circuit 214 may similarly be input to an eight bit PS_1 output register 240. An eight bit comparator 242 may compare the signals from registers 238 and 240 and generate a signal indicating the comparison outcome. This signal may be input to programmable allocation circuit 236, as shown.

Programmable allocation circuit 236 may accept the comparison outcome signal from eight bit comparators 230 and 242, as described above, and process the signal to implement a rules-based power allocation scheme. If electronic system 100 is operating within established parameters, no adjustment may be required to the power consumption of processors 122 and 124 (shown in FIG. 1). If the power consumption of electronic system 100 is too high, as reported by the comparison outcome from the eight bit comparator 230, programmable allocation circuit 236 may be programmed to transmit a signal shown in FIG. 2, either as "Single issue 0" or "Single issue 1." In the case of "Single issue 0," the signal may be accepted by processor 122 as a command to pause or slow operations, thereby reducing power consumption until the power overload is resolved. "Single issue 1" similarly applies to processor 124. After slowing or pausing operations, a second signal may issue to processor 122 or 124 as a command to resume operations at normal speed, thereby increasing power consumption until the reference signal generated by one of process circuits 232 or 234 indicates a need for power reduction. Alternatively, a series of "Single issue" signals may cause a processor 122, 124 to vary speeds over a predetermined range, pursuant to design features. The respective "Single issue" signals, as well as the associated comparison outcome information, may be periodically provided in response to a clock cycle signal from oscillator 244 on a bus 246. Oscillator 244 may also govern the operation of processors 122 and 124. Output from programmable allocation circuit 236 may alternatively be used to adjust the clock signal from oscillator 244, or to vary the power output of power supplies 112 and 114.

The selection of whether to pause or slow processor 122 or 124 may be made on the basis of whether power consumption is greater from power supply 112 or power supply 114. Operation on a processor that consumes the greater amount of power may be paused or slowed first, for example. Power consumption may be determined on the basis of signals from power sense circuit 212 or 214 because voltage outputs PS_0 $V_{out}$ and PS_1 $V_{out}$ may also be known. Programmable allocation circuit 236 may instruct reduction of power consumption at either processor 122 or 124 if either processor is consuming more power than it is designed to consume, even if total system power consumption is below a maximum limit.

Figure 3:
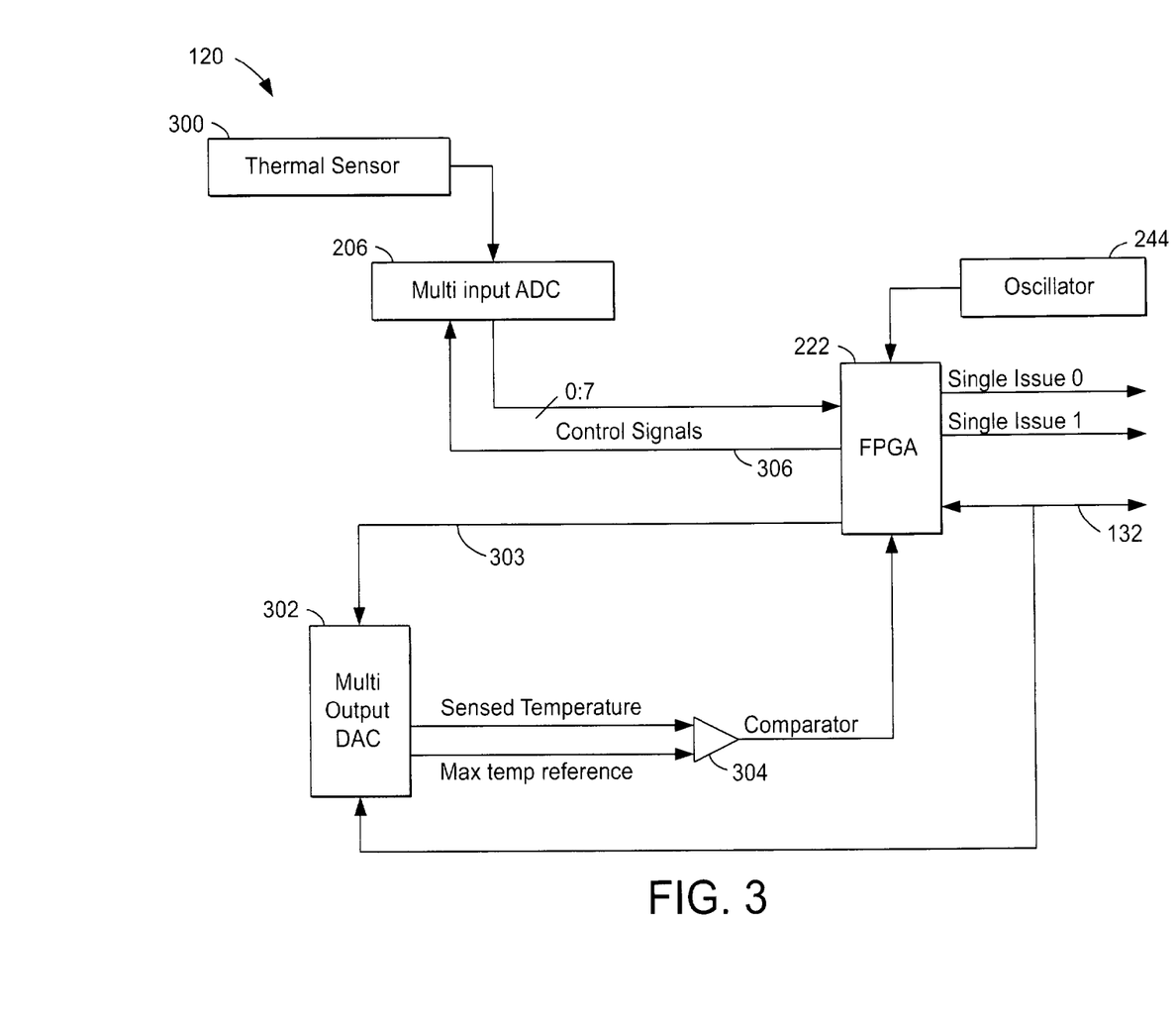
FIG. 3 is a block schematic diagram showing portions of one programmable control circuit that allocate power on the basis of thermal management.

Power consumption by the processors 122 and 124 may also cause temperature increases that exceed the thermal operational limits of the power supply subsystem 102. FIG. 3 is a block schematic diagram showing one embodiment of programmable control circuit 120 that operates processors 122 and 124 at a maximum allowable throughput, to regulate power supply subsystem 102 within a temperature range established by thermal design requirements.

A thermal sensor 300 may be installed on one or more elements of electronic system 100, FIG. 1, such as system boards for power supply subsystem 102, one or more of power supplies 112, 114, 116, 118, and/or processors 122, 124. Thermal sensor 300 may transmit an analog signal representative of sensed temperature to a multiple input analog-to-digital converter, such as analog-to-digital converter 206, FIG. 2. The digitized signal from the analog-to-digital converter may be transferred to FPGA 222, which may store the signal and provide the measurement value to other components of electronic system 100, over bus 132. Thus, other system components may take advantage of the temperature status of any component in making decisions to optimize power consumption on the basis of direct temperature measurement. As shown in FIG. 3, FPGA 222 may provide control signals including the temperature measurement signal to a multiple output digital-to-analog converter (DAC) 302 over bus 303; DAC 302 may for example, generate voltage signals representing the sensed temperature from thermal sensor 300 and a voltage reference signal indicating a maximum reference temperature. Comparator 304 may compare these two input signals and generate a control signal to FPGA 222, such that FPGA stores, pauses, or enables operations on processors 122 or 124 according to the "Single issue 0" and "Single issue 1" schema described above. Slowing or pausing of processor operations may be designed to facilitate thermal cooling of excessive component temperature sensed by thermal sensor 300. Control signals transmitted on bus 306 from FPGA 222 to analog-to-digital converter 206 may be selectively used as input to configure programmable control circuit 120 for the operations described herein. Timing of these operations may periodically occur on the basis of a clock signal from oscillator 244.

Figure 4:
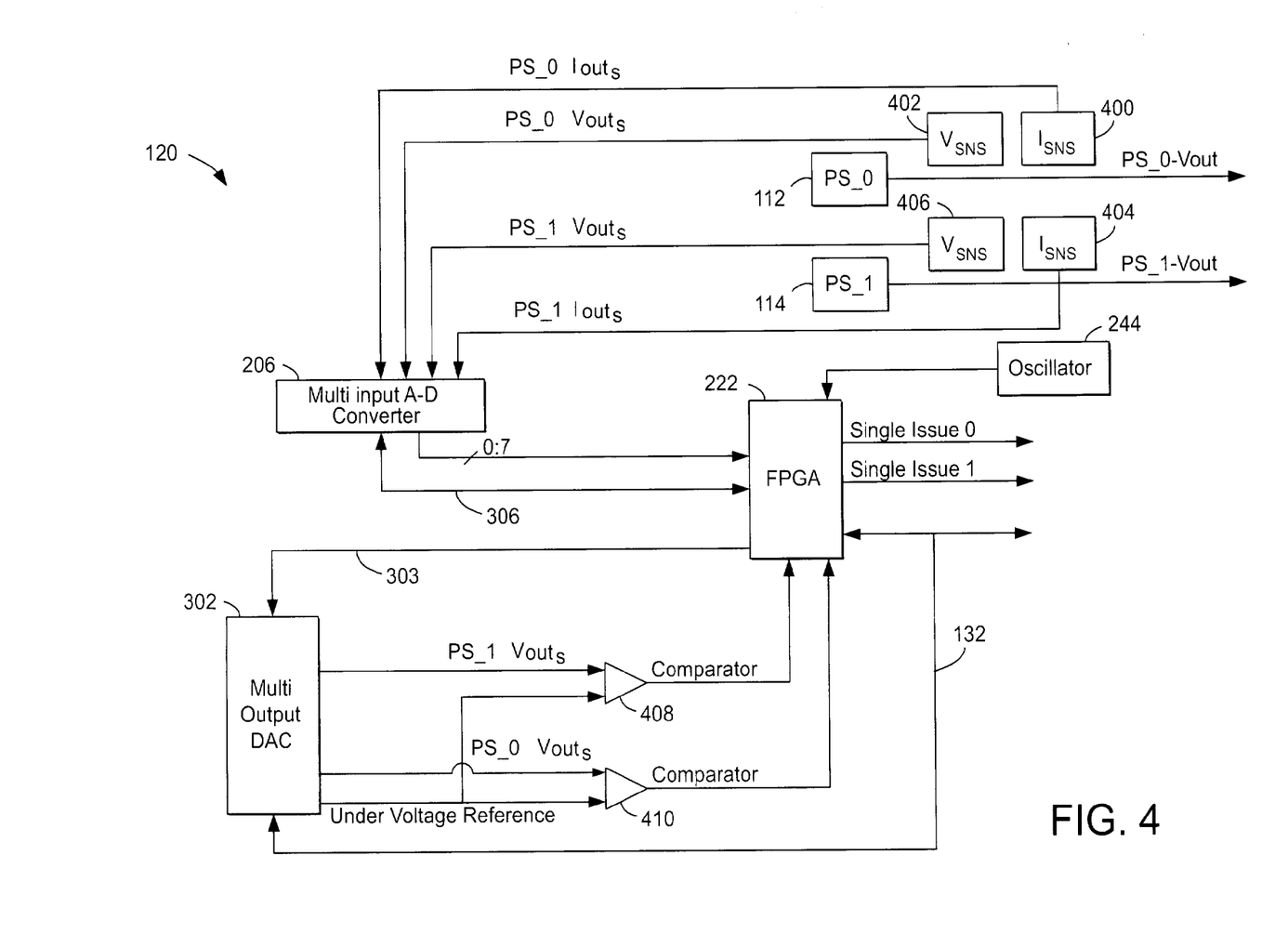
FIG. 4 is a block schematic diagram showing portions of one programmable control circuit that provide brownout protection.

In the event that voltages PS_0 $V_{out}$ or PS_1 $V_{out}$ of FIG. 1 are less than operating design limits, e.g., in a brownout, silent data corruption may occur due to the under-voltage condition. FIG. 4 is a block schematic diagram depicting one embodiment of programmable control circuitry 120 that may prevent silent data corruption due to under-voltage conditions.

Voltage and current measurements may be sensed for the output of power supply 112 by current sense circuit 400 and voltage sense circuit 402 to produce signals including PS_0 Iout$_s$ and PS_0 Vout$_s$, respectively. Similarly, voltage and current measurements may be sensed from power supply 114 by current sense circuit 404 and voltage sense circuit 406 to produce signals including PS_1 Iout$_s$ and PS_1 Vout$_s$, respectively. The respective analog signals PS_0 Iout$_s$, PS_0 Vout$_s$, PS_1 Iout$_s$ and PS_1 Vout$_s$ may be transmitted to multi-input analog-to-digital converter 206. The resultant digital signal may be transferred to FPGA 222, which may store the signal and calculate a power output determination for each of power supplies 112 and 114. Thus, FPGA 222 may provide control signals to DAC 302. The control signals may include digital representations of the PS_0 Vout$_s$ and PS_1 Vout$_s$ signals. In turn, DAC 302 may generate analog signals representing the PS_0 Vout$_s$ and PS_1 Vout$_s$ signals, as well as the under voltage reference, as shown. Comparator 408 may compare PS_1 Vout$_s$ to the reference signal to generate a control signal to FPGA 222. Comparator 410 may also operate on two input signals, e.g., PS_0 Vout$_s$ and the under voltage reference, and may transmit to FPGA 222 a signal indicating the comparison outcome. In turn, FPGA 222 may operate on the comparisons of PS_1 Vout$_s$ and PS_0 Vout$_s$ to pause or enable operations on processors 122 or 124 according to the "Single issue 0" and "Single issue 1" schema described above; except slowing or pausing of processor operations may be designed to facilitate power load reduction whereby the PS_1 Vout$_s$ and PS_0 Vout$_s$ voltages are above the under voltage reference. As above, control signals transmitted on bus 306 from FPGA 222 to multi-input analog-to-digital converter 206 may be selectively used to configure programmable control circuit 120 for the operations described herein; and timing of these operations may be regulated by a clock signal from oscillator 244.

Figure 5:
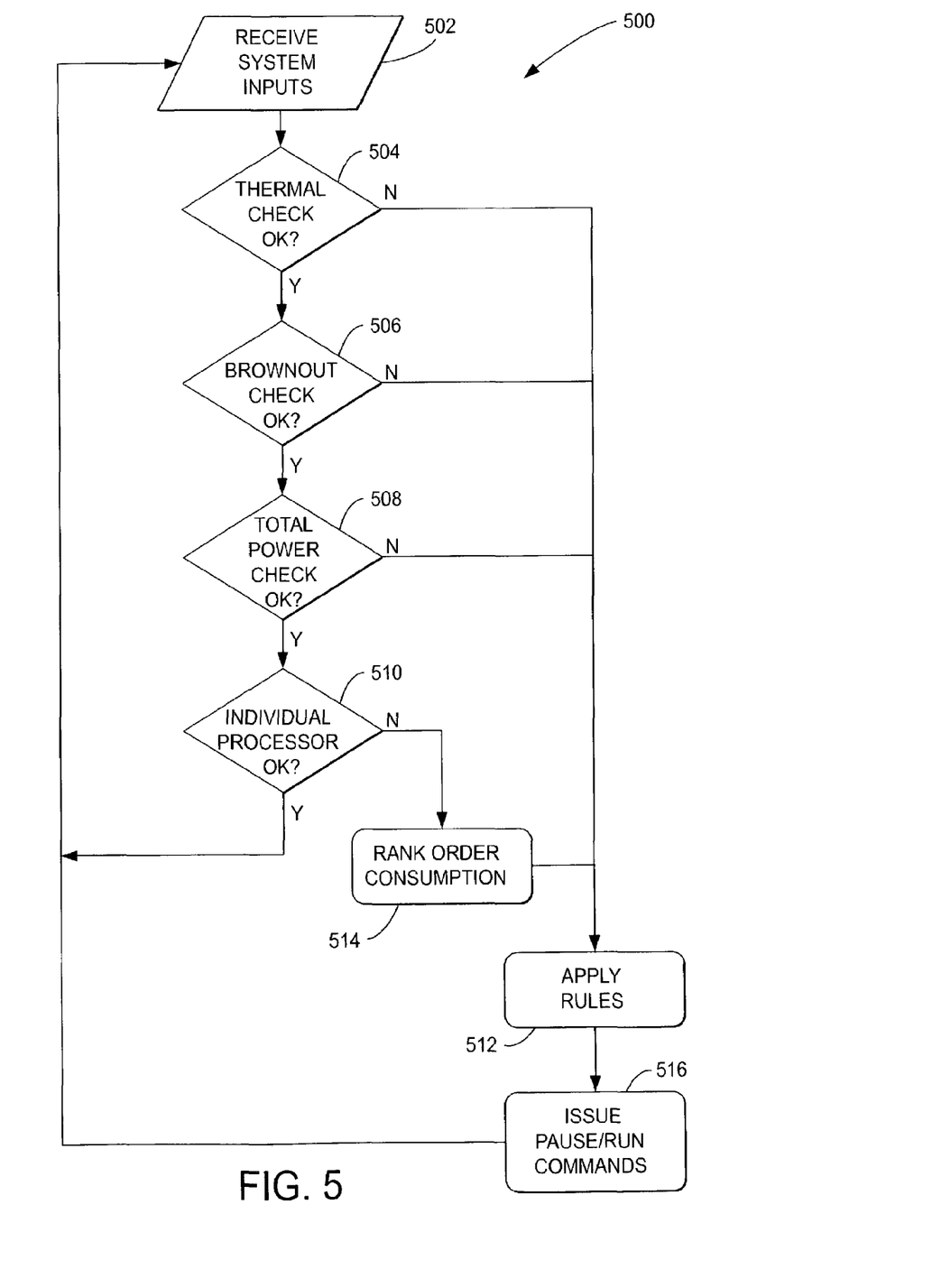
FIG. 5 is a flow chart illustrating operation of the electronic system of FIG. 1.

FIG. 5 shows process 500, which provides an ordering of power management priorities in a manner that resolves conflicts between the power management priorities. In step 502, system inputs including voltage and current measurements are obtained in the manner described above, e.g., for respective components of programmable control circuit 120 operating contemporaneously, as shown in FIGS. 2, 3, and 4. System inputs may be received on the basis of system clock cycle, e.g., from oscillator 244.

Comparisons may be made, for example, as indicated in a thermal check step 504, by using comparator 304 to provide FPGA 222 with a signal indicating whether a sensed temperature measurement exceeds a maximum temperature reference representing an undesirable high temperature. The location of thermal check step 504 shows that thermal management may have the highest priority among all other priorities. As shown in FIG. 5, this may be done to prevent thermal damage to system components. Any other priority may be selected to have the highest priority according to system design parameters. If thermal limits have not been exceeded, FPGA 222 in a brownout check step 506 accesses input from the circuitry shown in FIG. 4, using inputs from comparators 408 and 410, to determine whether electronic system 100 is operating at normal voltages, i.e., not at an under-voltage condition. If there is no under-voltage condition, FPGA 222 in a total power check step 508 accesses input from eight bit comparator 230 to determine whether electronic system 100 is consuming less than system design limits for total consumable power. If so, FPGA 222 in individual processor check step 510 determines whether each of the individual processors 122 and 124 are consuming less than system design limits for consumable power at the respective processors, or whether computational speed may be increased. If no adjustment is required in steps 504 to 510, processing at each of the processors 122 and 124 continues as before.

If adjustments to processor operations are required or desirable as a result of any one of steps 504 to 510, rules for implementation of processor slowing or pausing may be applied in a rules application step 512. In the case of individual processor check step 510 preceding the rules implementation step 512, step 514 may rank-order the priority of processors 122 and 124 in terms of their power consumption.

The rules application step 512 may resolve any conflicts between the outcomes of steps 504 to 510. For example, if individual processor check step 510 determines that additional power might be consumed to obtain more processing speed, but thermal check step 504 indicates that temperature is too high, processors 122, 124 may be paused to permit cooling despite the fact that more computational speed could be obtained. This slowing or pausing of operations may protect system components from thermal damage. Similarly, if more computational speed can be obtained from processors 122 and 124, but brownout check step 506 indicates an under-voltage condition, processor operations may be paused or slowed to prevent silent data corruption. In like manner, if more computational speed could be obtained from processors 122, 124, but total power check step 508 indicates that electronic system 100 is at its total power consumption limit, processor operations may be paused.

Rules application step 512 may also determine the way in which processor slowing or pausing will occur. For example, a mathematical algorithm may be used to calculate slowing over a period of time to implement a plan for thermal cooling on the basis of an actual temperature sensed by the thermal sensor 300. Another algorithm may, for example, be used to slow a processor over an interval of time on the basis of a projected power reduction. Alternatively, each indication that a pause is needed from any of steps 504 to 510 may be associated with a pause command or a fixed number of sequential pause commands. These commands may be implemented according to features of processors 122 and 124.

It will be appreciated that the "Single issue" commands which are issued from FPGA 222 to processors 122 and 124 may be replaced by commands to oscillator 244. Thus, the speed of processor operations may be adjusted on the basis of clock cycle. For example, a 20% reduction in clock cycle may lead to a 20% reduction in power consumption. A variety of commercially available processors have clock dividers that accept commands to adjust the clock speed within predetermined increments over an operating range. In combination with this type of power savings on the basis of clock speed, FPGA 222 may also issue commands to power supplies 112 and 114 to adjust the output voltages PS_O $V_{out}$ and PS_1 $V_{out}$.

It is further appreciated that step 516 may entail issuing pause/run commands, e.g., through the "Single issue" schema described above, to govern power consumption as directed by the application of the rules.

The foregoing discussion is intended to illustrate the concepts of the invention by way of example with emphasis upon the preferred embodiments and instrumentalities. Accordingly, the disclosed embodiments and instrumentalities are not exhaustive of all options or mannerisms for practicing the disclosed principles of the invention. The inventors hereby state their intention to rely upon the Doctrine of Equivalents in protecting the full scope and spirit of the invention.

We claim:

1. A power allocation electronic system comprising:
   a power delivery subsystem;
   a processor module comprising a plurality of processors;
   a power supply subsystem adapted to distribute power from the power delivery subsystem to the processor module;
   sense circuitry configured to provide a plurality of power information signals including a first feedback signal that represents a brownout condition, a second feedback signal that represents a thermal value, a third feedback signal that represents a total system power consumption, and a plurality of fourth feedback signals that each represents a power consumption of one of the processors, each of the feedback signals being allocated to a corresponding power management priority, wherein the first, second and third feedback signals are associated with a higher power management priority than any of the plurality of fourth feedback signals; and
   programmable control circuitry configured to receive the feedback signals from the sense circuitry and to provide control signals governing operation of the processors on the basis of the feedback signals,
   the programmable control circuitry being configured to manage power consumption at the processor module by adjusting processor module operations by applying rules to the plurality of power management priorities determined in association with the power information signals for the purpose of resolving power management conflicts by at least one of reducing clock speed and issuing a pause command for at least one of the processors.

2. The system of claim 1, wherein the power supply subsystem comprises a plurality of power supplies, each of the power supplies being adapted to distribute power from the power delivery subsystem to a corresponding one of the processors, and wherein the programmable control circuitry is further configured to reduce an output voltage of the one of the power supplies corresponding to the at least one of the processors in addition to reducing the clock speed.

3. The system of claim 1, further comprising isolation barrier circuitry used to protect the programmable control circuitry from noise in the power information signals.

4. The system of claim 3, wherein the isolation barrier circuitry comprises a linear isolation amplifier.

5. The system of claim 1, wherein the power management priorities comprise at least one of a system thermal limit, a total system power consumption limit, an under-voltage control limit to prevent silent data corruption, and a limit for power consumption at each processor.

6. The system of claim 1, wherein the programmable control circuitry comprises a programmable gate array adapted to receive comparator outputs for use in making decisions for allocation of processor power consumption.

7. The system of claim 1, wherein the programmable control circuitry comprises program instructions for resolving conflicts between the plurality of power management priorities and for allocating power consumption in response to resolving the conflicts.

8. An electronic system with power load allocation capability, comprising:
a multi-processor module comprising a plurality of processors;
means for distributing incoming power to the multi-processor module;
means for detecting a supply voltage of each of the processors, a temperature, a total power consumption, and a power consumption of each of the processors; and
means for controlling power consumption at the multi-processor module on the basis of the supply voltage of each of the processors, the temperature, the total power consumption, and the power consumption of each of the processors, an under-voltage control limit, a thermal limit, a total power consumption limit, an individual processor power consumption limit, wherein each of the under-voltage control limit, the thermal limit, the total power consumption limit, and the individual processor power consumption limit is allocated a corresponding power management priority, and wherein the power management priority of the individual processor power consumption limit is lower than any of the corresponding power management priorities of the under-voltage control limit, the thermal limit, and the total power consumption limit;
the means for controlling power consumption including at least one of means for reducing clock speed and means for pausing execution for at least one of processors.

9. A method of allocating power through an electronic system, comprising:
delivering power to the electronic system;
distributing the power to a processor module comprising a plurality of processors;
managing power consumption within the processor module by use of programmable control logic configured to exchange sense and control signals with the processor module;
performing a brownout check, a thermal check, a total power check, and an individual processor power check based on the sense signals to acquire check results;
allocating one of a plurality of power management priorities to each of the brownout check, the thermal check, the total power check, and the individual processor power check, wherein the individual processor power check is allocated a lower power management priority than any of the brownout check, the thermal check, and the total power check;
adjusting processor operations based upon the plurality of power management priorities by performing by way of the control signals at least one of issuing one or more pause and run command signals to at least one of the processors and reducing clock speed for at least one of the processors; and
resolving conflicts between the power management priorities by applying rules based upon the check results.

10. The method of claim 9, wherein the power management priorities comprise at least one of a thermal limit, an under-voltage control limit, a total power consumption limit, and an individual processor power consumption limit.

11. The method of claim 9, wherein the step of delivering power to the electronic system comprises sensing power information signals from a power delivery subsystem and delivering the power information signals to the programmable control circuitry while protecting the programmable control circuitry from power delivery subsystem noise through use of an isolation barrier.

12. The method of claim 11, wherein the programmable control circuitry implements instructions to govern total system power throughput on the basis of the power information signals.

* * * * *

UNITED STATES PATENT AND TRADEMARK OFFICE
CERTIFICATE OF CORRECTION

| | |
|---|---|
| PATENT NO. | : 7,313,706 B2 |
| APPLICATION NO. | : 10/246024 |
| DATED | : December 25, 2007 |
| INVENTOR(S) | : Gary Wayne Williams et al. |

It is certified that error appears in the above-identified patent and that said Letters Patent is hereby corrected as shown below:

Column 11, line 27, in Claim 8, insert -- and -- before "an".

Column 12, line 14, in Claim 9, delete "cheek," and insert -- check, --, therefor.

Signed and Sealed this

Third Day of June, 2008

JON W. DUDAS
*Director of the United States Patent and Trademark Office*